June 21, 1955 J. A. PEREZ 2,711,186
EMERGENCY CHECK VALVE FOR HYDRAULIC BRAKES
Filed Nov. 16, 1951 2 Sheets-Sheet 1
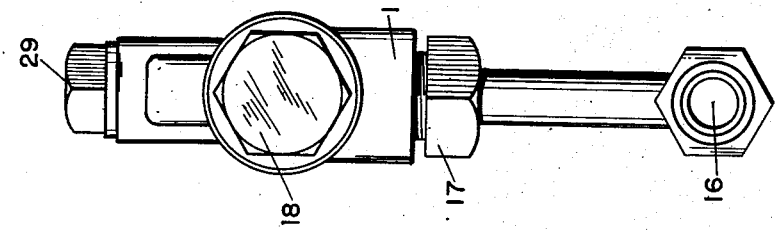
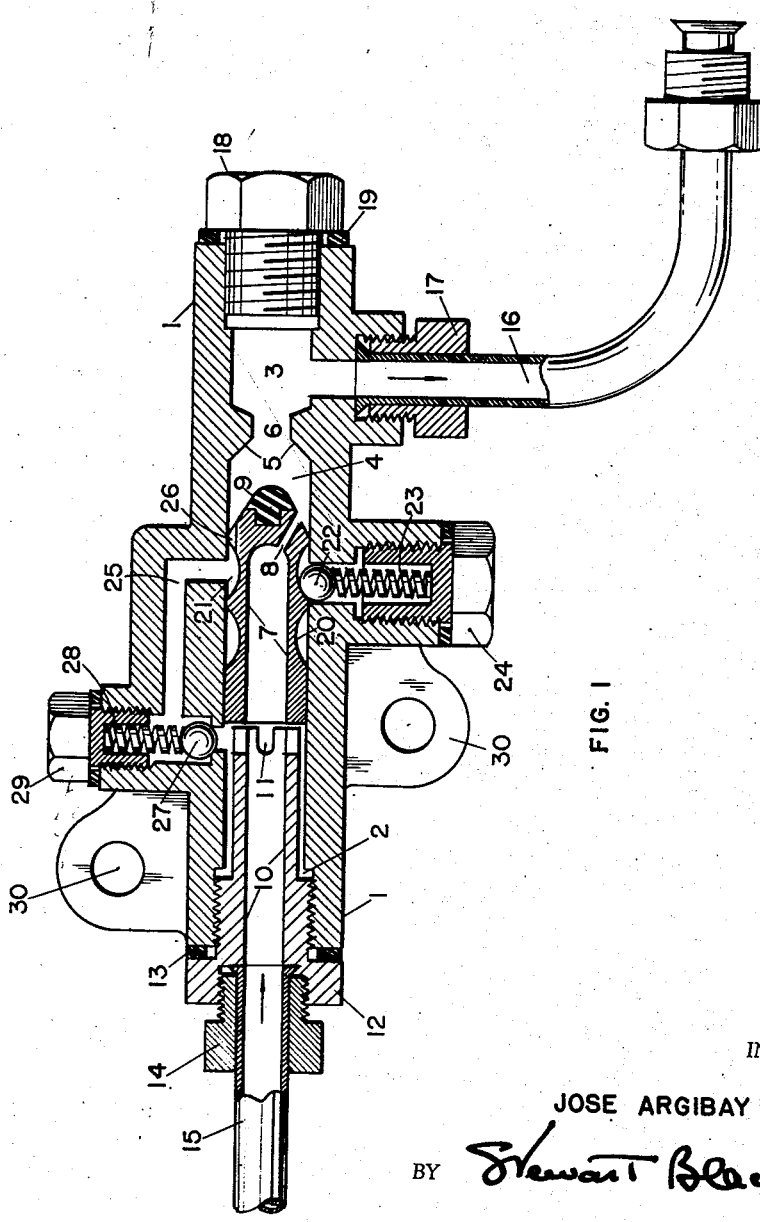
INVENTOR
JOSE ARGIBAY PEREZ
BY
ATTORNEY June 21, 1955  J. A. PEREZ  2,711,186
EMERGENCY CHECK VALVE FOR HYDRAULIC BRAKES
Filed Nov. 16, 1951  2 Sheets-Sheet 2
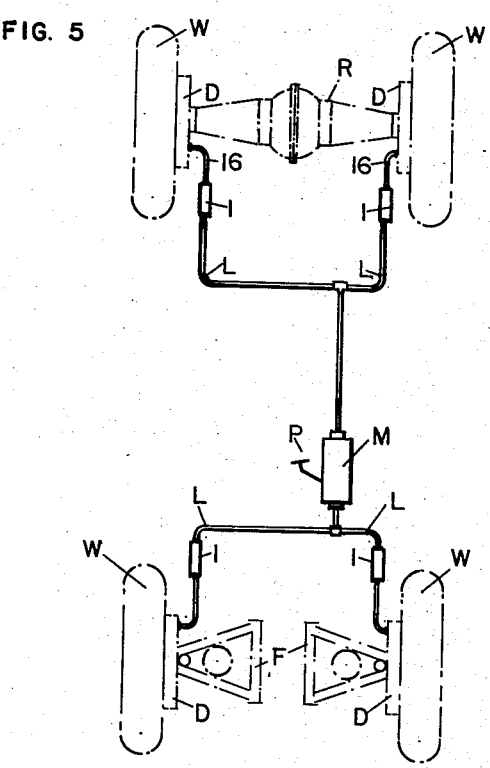
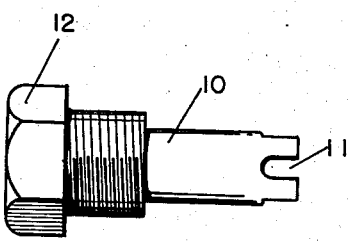
FIG. 3
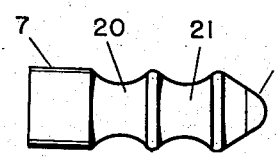
FIG. 4
INVENTOR
JOSE ARGIBAY PEREZ
BY Stewart Blackmore
ATTORNEY

United States Patent Office 2,711,186
Patented June 21, 1955

2,711,186

EMERGENCY CHECK VALVE FOR HYDRAULIC BRAKES

José Argibay Perez, Central Preston, Cuba

Application November 16, 1951, Serial No. 256,754

2 Claims. (Cl. 137—460)

The invention relates to fluid pressure system controls and, more particularly, to improvements in an emergency check valve in hydraulic braking systems for automotive vehicles.

The valve to which the invention has particular application is of the type employing a fluid-pressure responsive piston interposed in the line to the brake drums so as to move under relatively elevated pressure therebehind and seal a valve seat against loss of the braking fluid when a leak in piping connections to the drums develops.

It is an object of the invention to provide an emergency check valve which will be simple in assembly, efficient in its operation, and economical in use.

Another object is to provide a device of the character and for the purposes described which may be readily serviced and maintained.

Yet another object is to provide a check valve which is easily accessible for adjustments and observation.

Other advantages of the invention will be discernible as the detailed description thereof hereinafter proceeds.

According to the invention, the emergency check valve comprises a casing characterized by a continuous bore in which is arranged a hollow piston having an axial duct to receive the braking fluid stream for delivery to an outlet chamber, there being a normally open valve seat engageable by the piston head upon its advance under relatively elevated fluid pressure therebehind. Thus, the flow through the bore is interrupted should a leak in the feed line develop between the check valve and the brake drums, thereby preventing loss of the fluid out of the system. Arranged in the inlet end of the bore, is an intake nozzle serving as a rear stop member against overretraction of the piston and directing the fluid to the piston.

The casing includes a by-pass conduit around the piston duct for draining the system and the like, this by-pass being valved to open by manual operation thereof. The bore has an access plug removable to re-set the piston following its movement under emergency conditions, the outlet chamber of the casing having a discharge connection thereto taken off at an angle to the axis of the bore so as to permit access thereto from the adjacent end thereof. Pressure-operated means to engage the piston in its advanced or retracted stations is provided to insure positive operation of the check valve under all conditions of operation.

The invention is embodied in the check valve which is exemplified in the accompanying drawings, in which the views are as follows, like reference numerals designating identical parts throughout the several figures:

Fig. 1, a sectional detail of the check valve;

Fig. 2, an end elevation thereof viewed from the right of Fig. 1;

Fig. 3, a side elevation of the intake plug;

Fig. 4, a similar view of the piston; and

Fig. 5, a schematic plan of a typical application of the emergency check valves to a conventional vehicle.

The emergency check valve has a casing 1, through which is extended a continuous bore, divided into an inlet chamber 2 at the rear end thereof, an outlet chamber 3 at the forward end thereof, and a piston chamber 4 intervening therebetween.

Interposed intermediate the piston and outlet chambers is an annular valve seat 5 having an axial restricted passage 6.

Arranged within the piston chamber, is a hollow piston 7, open-ended rearwardly thereof and having a discharge orifice 8 in the forward end thereof. The orifice 8 is off-set or deviated from the axis of the piston so as to leave intact a valve head 9 which may be formed of rubber or like resilient material on the forward end of the piston.

Seated within the inlet chamber of the bore is an intake nozzle 10, in axial alinement with the piston 7 to direct a fluid stream thereinto. The intake nozzle terminates at its forward end in a plurality of radial slots 11 for a purpose to be hereinafter described, and is threadedly received in the inlet chamber in which it is turnable by a nut 12 adapted to be tightened against a suitable gasket 13. Connected in axial alinement with the intake nozzle is a connection plug 14 which secures the supply conduit 15 feeding braking fluid from the master cylinder of the system with which the braking installation comes conventionally equipped.

Communicating with the outlet chamber 3, is a delivery conduit 16 for the transmission of fluid passed through the check valve to the brake drum structure, this conduit being secured to the casing through a connection plug 17, threaded therein so as to receive the fluid at an angle to the axis of the bore. This connection may be effected at any angle leaving the outlet end of the bore free for insertion therein of a tool or instrument necessary to clean or adjust the valve mechanisms arranged along the bore. An access plug 18 is threaded into the casing at the forward end of the bore, being removable at the convenience of the operator. A suitable gasket 19 may be interposed between the casing and nut of the plug 18. Thus, the construction of the check valve thus far described provides a continuous bore with essential elements of the valve therein arranged in axial alinement to permit free flow of the braking fluid and ready access to interior parts.

The piston has formed therearound, a pair of parallel, circumferential grooves 20 and 21, either of which is engageable by a ball 22 urged thereinto by a helical spring 23 held in a socket axially of a plug 24, threaded into the casing structure. Thus, the piston may be positively positioned in either of two stations along the piston chamber by the externally applied frictional engagement of the spring-urged ball 22. The radius of each of the grooves 20 and 21, transversely thereof, is preferably greater than that of the ball 22, whereby to effect a longitudinal thrust against the shoulder of the groove in immediate frictional contact with the ball as, for example, in Fig. 1 the piston has exerted thereon a longitudinal thrust rearwardly by virtue of the pressure which the spring 23 exerts in a radial direction against the rear portion or shoulder of groove 21. Again, the arrangement of the frictional ball member exteriorly of the piston permits a free flow of fluid through the piston, there being no mechanisms in the interior thereof to accomplish the piston positioning function herein described.

The casing has formed therein, an auxiliary passage 25, having its inlet in communication with the radial slots 11 of the intake nozzle. The outlet of this passage discharges into the adjacent trough portion of the groove 21 and thence the flow is received through a longitudinal channel 26, grooved in the periphery of the piston adjacent the nosing thereof. At the inlet thereof, the auxiliary passage is normally sealed by a ball valve 27 held in sealing relation with this inlet by a helical spring 28 socketed axially of a plug 29 threaded into the adjacent casing structure. Thus, by releasing the tension on this spring, the ball valve 27 yields against the pressure of the fluid to provide a by-pass around the piston assembly, as for drainage purposes and the like, the auxiliary passage serving to supplement the piston passages to facilitate the ready flow of relatively high viscosity braking fluids through the device.

The casing may be provided with bracket members 30 on opposite sides thereof to permit attachment of the device to the chassis framing or other convenient installation points as may be required by the vehicle's assembly.

The emergency check valve may be installed according to the schematic diagram illustrated in Fig. 5, wherein the brake drum structures are designated by D on rear axles R and front axle structure F, these being equipped with wheels W. The system includes the usual master cylinder M having pedal P for the application of pressure to the braking fluid. Branch piping provides four feed lines L from the master cylinder and the valve casings 1 may be installed at points conveniently adjacent the drums by disconnecting existing hose connections to brake drums and interposing the valves so as to connect the intake nozzles to the piping and then coupling the wheel brake hose to delivery conduit 16.

In practice, braking fluid under normal operating pressure is admitted through the intake nozzle 10 for delivery to the piston 7, from which it is discharged through orifice 8 and valve passage 6 to the outlet chamber 3, being then conveyed by the delivery conduit 16 to the brake mechanism. Upon a line failure in the hose connection to the drum, the relatively elevated pressure which will then develop behind the piston will cause its advance to bring the valve head 9 into sealing engagement with the valve seat 5 to prevent loss of fluid out of the system. Following the repair of the leak, the piston is retracted by removing access plug 18 and inserting any convenient tool, such as a screwdriver, into the bore to move the piston rearwardly. The relatively elongated characteristic of the intake nozzle permits its functioning as a stop member against over-retraction of the piston. Simultaneously, this nozzle, in axial alinement with the piston, directs a smooth fluid stream into the body thereof, while the groove-engaging ball 22 is effective to retain the piston out of sealing engagement with the valve seat 5.

The invention is thus seen to provide an emergency check valve fulfilling the objectives hereinabove set forth.

I claim:

1. In a device of the character described, the combination of a casing having a longitudinal bore defining axially alined rear inlet, forward outlet, and intervening piston chambers, a normally open valve seat defined between the piston and outlet chambers, a tubular piston reciprocable in the piston chamber and open-ended rearwardly thereof, said piston terminating forwardly thereof in a conical valve head having an orifice for the flow of a fluid stream through the piston and a supplemental longitudinal groove peripherally thereof in isolated relation to said orifice, an intake nozzle threaded in said inlet chamber axially thereof to direct said stream into said piston and form a rear stop member therefor, said piston being advanceable under relatively elevated fluid pressure therebehind for engagement with said valve seat to thereby seal said orifice and said supplemental groove and prevent the flow of said stream through said bore, the piston having a circumferential groove there being a spring-actuated groove-engaging means arranged in said casing and receivable in said circumferential groove to restrain the piston in normally retracted position, said casing including an auxiliary passage having an inlet end communicating with said intake nozzle and an outlet end discharging into the circumferential groove, said peripheral groove communicating with said circumferential groove whereby to provide a by-pass flow of the stream exteriorly of said piston, a ball valve in said auxiliary passage inlet and spring means urging said ball valve in normally sealed relation with said passage inlet to bias the ball valve against inlet pressure, a threadable plug in said casing operably associated with said spring means and turnable to release said ball valve to open the passage inlet, an intake coupling threaded axially into said intake nozzle and a fluid supply conduit received in said coupling, a fluid discharge conduit detachably connected to said outlet chamber at an angle to the axis of said bore, and an access plug threaded into said bore endwise of the outlet chamber.

2. The invention as defined in claim 1 and: said intake nozzle being slotted in the circumferential periphery at the discharge end thereof for communication with the inlet end of said auxiliary passage.

References Cited in the file of this patent

UNITED STATES PATENTS

| | | |
|---|---|---|
| 524,393 | Neely | Aug. 14, 1894 |
| 1,748,793 | Prewat et al. | Feb. 25, 1930 |
| 2,093,015 | Madden | Sept. 14, 1937 |
| 2,127,849 | Stone | Aug. 23, 1938 |
| 2,138,719 | Wright | Nov. 29, 1938 |
| 2,300,694 | Overbeke | Nov. 3, 1942 |
| 2,408,799 | Mellichar | Oct. 8, 1946 |
| 2,411,392 | Saville | Nov. 19, 1946 |
| 2,481,460 | Williams | Sept. 6, 1949 |